US 8,451,329 B2

(12) United States Patent
Addy

(10) Patent No.: US 8,451,329 B2
(45) Date of Patent: May 28, 2013

(54) PTZ PRESETS CONTROL ANALYTICS CONFIGURATION

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 1611 days.

(21) Appl. No.: 11/503,711

(22) Filed: Aug. 14, 2006

(65) Prior Publication Data

US 2008/0036860 A1 Feb. 14, 2008

(51) Int. Cl.
*H04N 7/18* (2006.01)

(52) U.S. Cl.
USPC ........... 348/143; 348/169; 348/149; 348/152; 382/183; 726/23

(58) Field of Classification Search
USPC ................. 348/137, 139, 140, 143, 144, 149, 348/152–159; 382/103
See application file for complete search history.

(56) References Cited

U.S. PATENT DOCUMENTS

| 6,727,938 | B1 | 4/2004 | Randall |
| 6,803,946 | B1* | 10/2004 | Wakiyama et al. ......... 348/211.6 |
| 2003/0227555 | A1 | 12/2003 | Kobayashi |
| 2005/0157169 | A1 | 7/2005 | Brodsky et al. |
| 2005/0275723 | A1* | 12/2005 | Sablak et al. ................. 348/169 |
| 2007/0115355 | A1* | 5/2007 | McCormack ................. 348/143 |

FOREIGN PATENT DOCUMENTS

| WO | WO 93/06690 | * | 3/1993 |
| WO | 93/06690 | | 4/1993 |

* cited by examiner

*Primary Examiner* — Sath V Perungavoor
*Assistant Examiner* — Nathnael Aynalem
(74) *Attorney, Agent, or Firm* — Husch Blackwell

(57) ABSTRACT

A system and method for PTZ presets control analytic configuration in one aspect provides a camera that includes PTZ preset information and analytics configuration information to allow local, that is, within the camera, processing at each preset position. In one embodiment, the information is set-up or configured using, for example, a PC, PDA (personal digital assistant), or the like, etc., which may be remotely or locally connected to a camera. In one aspect, if a PTZ camera is being operated manually and is moved to a particular position, the PTZ automatically moves to the nearest preset position and operates under the conditions of the associated analytics configuration.

16 Claims, 3 Drawing Sheets

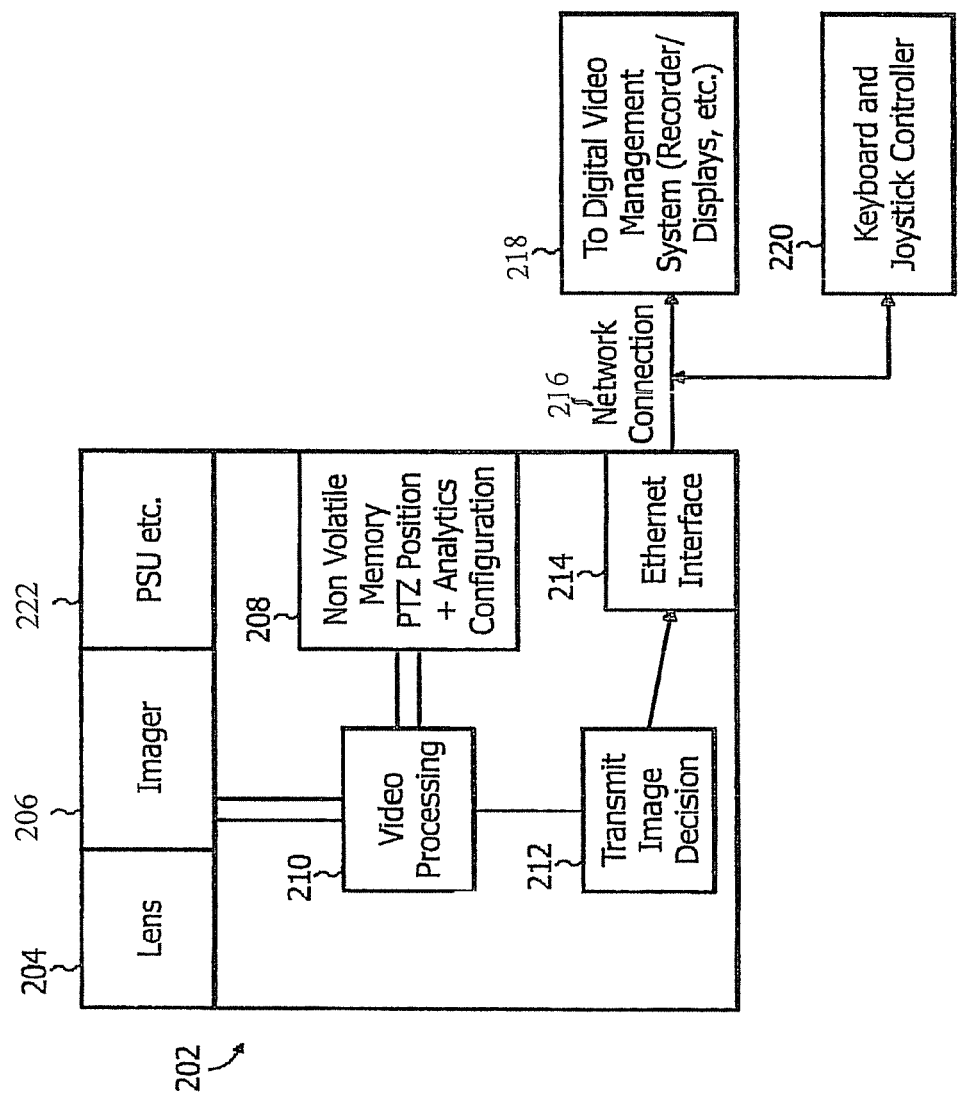

PTZ PRESETS CONTROL ANALYTICS CONFIGURATION

BACKGROUND OF THE INVENTION

1. Field of Invention

The present disclosure generally relates to surveillance systems, and particularly to pan-tilt-zoom (PTZ) presets control analytics configuration.

2. Description of Related Art

Closed-circuit television (CCTV) is often used for video surveillance systems, for example, to provide security for a wide range of businesses or homes. In order to reduce data transfer on a digital CCTV network and the amount of activity that requires human surveillance, modern CCTV systems process video streams and video storage on the basis that parts of an area being monitored may be blocked. Examples of blocked areas include a privacy zone or an area in the field of view that is beyond the perimeter being protected. Processing may also be restricted depending on certain types of activity that should be detected, for example, human activity in a certain area.

A system installer typically configures the blocked area at the time of installation, for example, using an application running on a personal computer (PC). The blocked area may be defined using a simple user-interface such as drag-and-drop shapes and lines using a computer mouse. A set-up step may also include scaling a scene so that it is simpler to discern a human over a broader depth of field. In both cases, the set-up is relatively simple on fixed cameras. However, on pan-tilt-zoom (PTZ) cameras, in which the direction and field of view varies depending on the position of the camera at any instant, set-up and operation become a more challenging problem.

Most modern PTZ and dome cameras include an algorithm to maintain the privacy zone blocking as a camera moves position, but the privacy zone prevents all information from being processed within the blocked region. More sophisticated modern video analytics algorithms may require processing of a human but not a vehicle in a particular area, for example, or may require different analytics functions depending on the time of day or day of week. U.S. Patent Application Publication No. US 2005/0157169 also describes a surveillance system configured for blocking zones.

PTZ cameras are also used in remote, virtual guard tour applications, wherein a sequence of cameras or camera positions are monitored periodically or pseudo-randomly to emulate a traditional tour by a security guard. In many cases, PTZ cameras will be used with their positions in certain pre-set locations where the monitored location is of interest. However, many of the possible pan, tilt and zoom combinations may contain no useful information. In addition, there is a general trend to move more of the image processing away from centralized server architecture to do more of the analysis in the cameras themselves.

BRIEF SUMMARY OF THE INVENTION

A system and method for surveillance system are provided. In one aspect a method for surveillance system comprises storing a plurality of pan-tilt-zoom positions and storing a plurality of analytics configuration information, each of the plurality of analytics configuration information associated with a corresponding pan-tilt-zoom position in the plurality of pan-tilt-zoom positions. The method further includes determining the current pan-tilt-zoom position of a camera and selecting analytics configuration information associated with the current pan-tilt-zoom position of a camera from the plurality of analytics configuration information. The method also includes performing surveillance analytics based on the selected analytics configuration information associated with the current pan-tilt-zoom position.

The step of performing surveillance analytics in one aspect may further include determining whether to transmit image information based on the selected analytics configuration information associated with the current pan-tilt-zoom position. In another aspect, the step of storing a plurality of pan-tilt-zoom positions may include storing a plurality of pan-tilt-zoom positions in the camera. Yet in another aspect, the step of storing a plurality of analytics configuration information may include storing a plurality of analytics configuration information in the camera.

Still yet in another aspect, the step of selecting analytics configuration information associated with the current pan-tilt-zoom position may be performed at a remote controller and the remote controller may send the selected analytics configuration information to the camera. In one aspect, the camera may be adjusted to one or more of the plurality of pan-tilt-zoom positions. The method may further include moving pan-tilt-zoom position automatically to the nearest one of the plurality of pan-tilt-zoom positions, if a user manually adjusts the pan-tilt-zoom position of a camera.

A surveillance system in one aspect includes non-volatile memory operable to store a plurality of pan-tilt-zoom positions and a plurality of analytics configuration information, each of the plurality of analytics configuration information associated with a corresponding pan-tilt-zoom position in the plurality of pan-tilt-zoom positions. The system also includes a means for determining current pan-tilt-zoom position of a camera, a means for selecting analytics configuration information associated with the current pan-tilt-zoom position of a camera from the plurality of analytics configuration information, and an analytics engine operable to perform surveillance analytics based on the selected analytics configuration information associated with the current pan-tilt-zoom position.

In another aspect, the system may further include the analytics engine is operable to determine whether to transmit image information based on the selected analytics configuration information associated with the current pan-tilt-zoom position. Yet in another aspect, the system may further include an electro-mechanical PTZ controller operable to adjust a PTZ position of a camera. Still in another aspect, the electro-mechanical PTZ controller may automatically adjust a PTZ position of a camera to the nearest one of the plurality of pan-tilt-zoom positions.

Further features as well as the structure and operation of various embodiments are described in detail below with reference to the accompanying drawings. In the drawings, like reference numbers indicate identical or functionally similar elements.

In another aspect, the system may further include a program storage device readable by machine, tangibly embodying a program of instructions executable by the machine to perform a method for surveillance system. The method includes the steps of storing a plurality of preset pan-tilt-zoom positions, storing a plurality of analytics configuration information, each of the plurality of analytics configuration information associated with a corresponding preset pan-tilt-zoom position in the plurality of preset pan-tilt-zoom positions, determining a current pan-tilt-zoom position of a camera, if a user manually adjusts the pan-tilt-zoom position of the camera to a particular position, a controller of the camera automatically moving and setting the current pan-tilt-zoom position of the camera from the particular position to a nearest one of the plurality of preset pan-tilt zoom positions, selecting analytics configuration information associated with the current pan-tilt-zoom position of the camera from the plurality of analytics configuration information and performing surveillance analytics based on the selected analytics configuration information associated with the current pan-tilt-zoom position.

BRIEF DESCRIPTION OF THE DRAWINGS

FIG. 2 illustrates a camera and its components in one embodiment of the present disclosure.

DETAILED DESCRIPTION OF THE INVENTION

A system and method in one aspect provides a surveillance system camera that includes PTZ information and analytics configuration information to allow local, that is, within the camera, processing at each preset position. In one embodiment, the information is set-up or configured using, for example, a PC, PDA (personal digital assistant), or the like, etc., which may be remotely or locally connected to a camera. If a PTZ camera is being operated manually and is moved to a particular position, the PTZ will automatically move to the nearest preset position and operate under the conditions of the associated analytics configuration.

Figure 1:
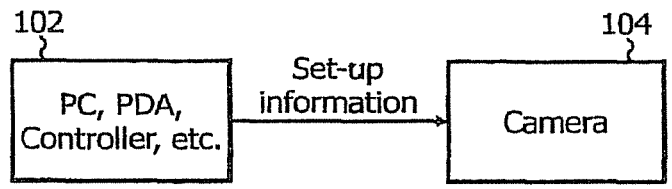
FIG. 1 is a block diagram illustrating camera set-up with analytic configuration information.

Referring now to the figures, FIG. 1 is a block diagram illustrating camera set-up with analytic configuration information. Analytic algorithms for example use analytic configuration information to process and analyze the incoming video stream from the camera. For instance, the analytic algorithms may track and identify objects and automatically detect events as security alerts according to analytic configuration information.

In an exemplary embodiment of the present disclosure, an operator or a user may use a PC, PDA, controller, or the like 102 to set-up configurations in a camera 104. The camera 104 may include any camera used for surveillance such as pan-tilt-zoom (PTZ) or dome cameras. PTZ capability allows a camera operator to pan (scan left and right), tilt (look up and down), and zoom in and out. Any other known or will-be-known cameras for surveillance with similar capabilities may be utilized. Configuration information may include a plurality of pre-set PTZ positions and analytics configuration information such as scaling, blocked or masked areas, protected objects, left objects, etc. In an exemplary embodiment, analytics configuration information is associated with each pre-set PTZ position. While FIG. 1 shows one camera, it should be understood that there may be more than one camera utilized in a surveillance system.

The set up information may be transmitted from a controller 102 to a camera 104 using any known or will-be-known communication medium and protocol. For instance, the information may be sent to a camera via bus protocol or RF protocol. In an exemplary embodiment of the present disclosure, a camera 204 stores locally the PTZ positions and associated analytics configuration information, for example, in a volatile memory co-located with the camera.

FIG. 2 is a block diagram illustrating a camera one embodiment of the present disclosure. A camera 202, for example, may include a lens 204, an imager 206, and a PSU 222, etc. As an example, an image coming through the lens 204 is converted into electronic format for processing. Non-volatile memory 208 such as FLASH or other non-volatile memory stores PTZ positions and associated analytics configurations. Other information or data may be also stored in the non-volatile memory 208. A processor in the camera, for instance, performs video processing 210 using images received from the imager.

In an exemplary embodiment of the present disclosure, appropriate analytics configuration information associated with the current PTZ position of the incoming image is selected from the pre-set PTZ positions and associated analytics configuration information, when processing the video images at 210. In one embodiment, if a PTZ camera is being operated manually and is moved to a particular position, the PTZ automatically moves to the nearest preset position and operates under the conditions of the associated analytics configuration.

A processor in the camera 202 evaluates the images incoming from the imager 206 based on the selected analytics configuration information and makes a decision whether to transmit the image to a digital video management system 218 for subsequent monitoring and/or recording. Images of blocked or masked areas or that are part of exclusion zones need not be transmitted. In an exemplary embodiment, the determination is made based on the PTZ position and its associated analytics configuration information. Thus, for example, for different PTZ positions, different analytics configuration information may be used.

Transmission of the images may be performed via any known or will-be-known communications medium and protocol. For instance, images may be transmitted via an Ethernet interface card 214 installed in the camera and a network connection 216 to a digital video management system 218. An input device 220 such as keyboard and/or joystick controller may also be connected to the camera via a network connection for communicating with the camera.

Figure 3:
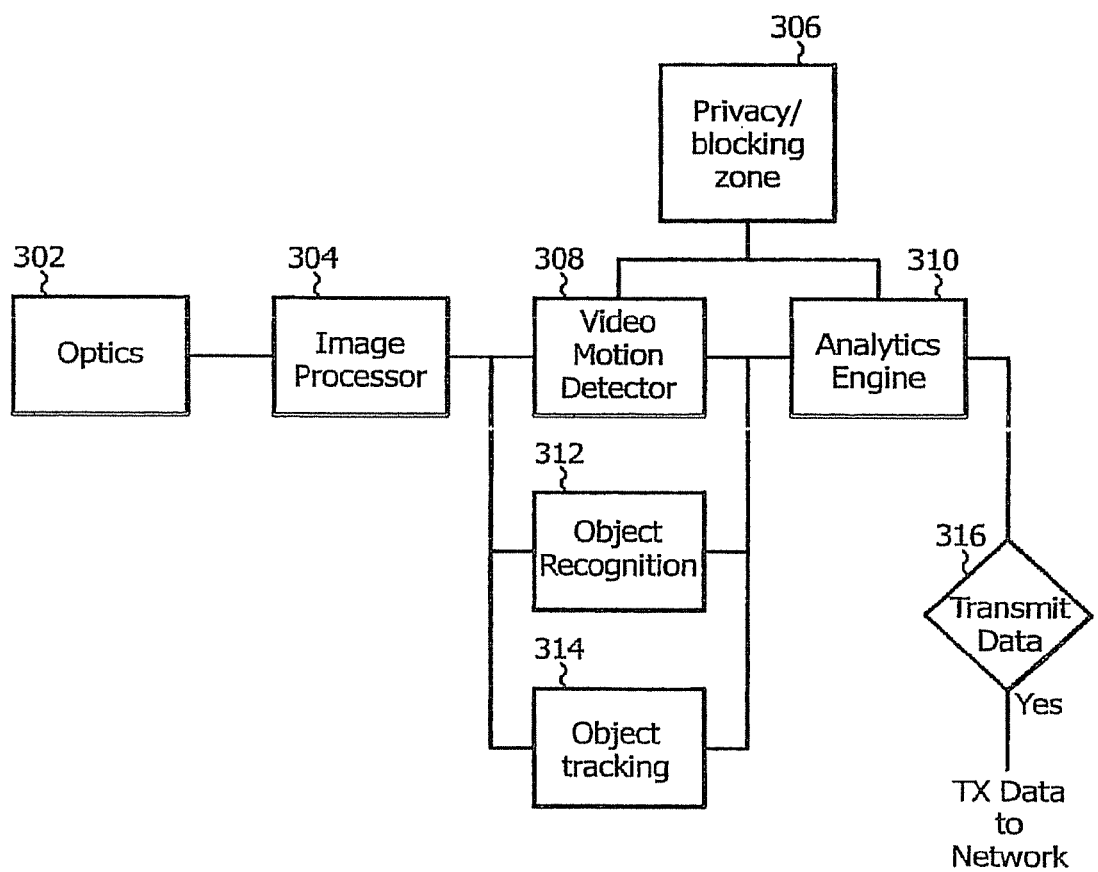
FIG. 3 is a diagram illustrating a surveillance system in one embodiment of the present disclosure.

FIG. 3 is a diagram illustrating a surveillance system in one embodiment of the present disclosure. Images of the areas being surveyed are received via an optics component 302 of the surveillance camera and sent to an image processor 304. As known to those skilled in the art, an image processor 304 may process the images to facilitate object recognition within image frames. An object recognizer 312 may identify objects, for instance, using a known technique such as image recognition based on shape and/or size of image pixels. The object recognizer 312 may use any other conventional or will-be-known techniques to identify objects. An object tracker 314 may record the tracks or path of the identified objects. A video motion detector 308 detects motion of objects. Objects are masked or blocked based on the privacy/blocking zone information 306 set for the current PTZ position of the camera. An analytic engine 310 analyzes the image information, for example, the objects that are identified and tracked, and determines whether to transmit the data to a video management system, for instance, as shown at 316.

Figure 4:
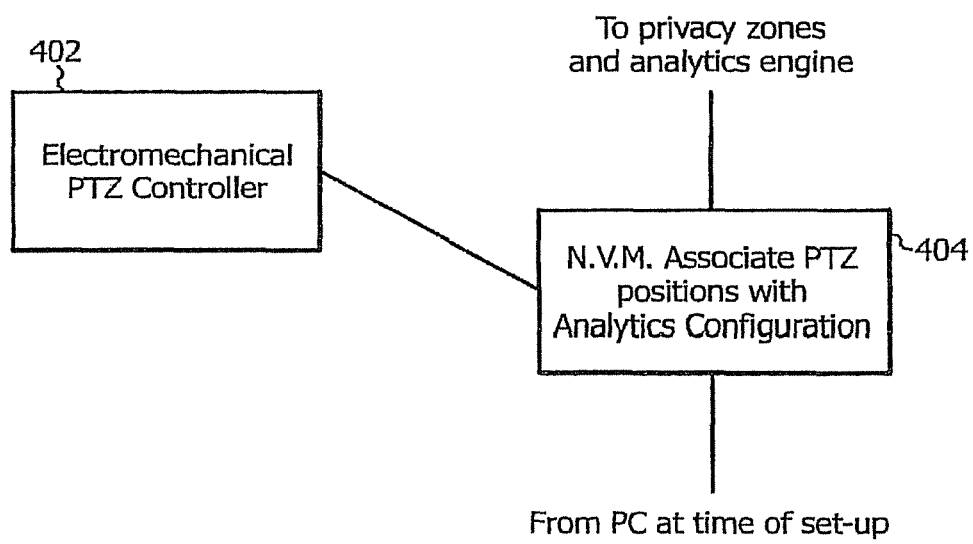
FIG. 4 is a diagram illustrating a method of selecting appropriate analytics configuration information in one embodiment of the present disclosure.

FIG. 4 is a diagram illustrating selecting of appropriate analytics configuration information in one embodiment of the present disclosure. A camera may be adjusted either manually or automatically to a plurality of PTZ positions. For example, an electro-mechanical PTZ controller 402 may receive input from a user and move the camera to one of the plurality of pre-set PTZ positions. Alternatively, a user may manually adjust the camera to a PTZ position.

In one embodiment of the present disclosure, if a PTZ camera is being operated manually and is moved to a particular position, an electromechanical PTZ controller 402 automatically moves the position to the nearest preset position. At 404, analytics configuration information associated with the current PTZ position is selected from a plurality of pre-set PTZ position information. The current PTZ position and the associated analytics configuration information are used for image processing as described with reference FIG. 3 above.

In one embodiment of the present disclosure, the PTZ pre-set locations are associated locally in the camera with analytics configuration presets also stored locally in the camera. In another embodiment, the PTZ pre-set locations are sent from a remote controller with information about the analytics configuration information for that particular PTZ pre-set location. Yet in another embodiment, the analytics configuration information may contain basic background information to allow an analytics algorithm to operate more quickly. Still yet in another embodiment, the system and method of the present disclosure allows guard tour type applications using PTZ cameras with analytics operating within the system.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for surveillance system, comprising:
    storing a plurality of preset pan-tilt-zoom positions;
    storing a plurality of analytics configuration information, each of the plurality of analytics configuration information associated with a corresponding preset pan-tilt-zoom position in the plurality of preset pan-tilt-zoom positions;
    determining a current pan-tilt-zoom position of a camera;
    a user manually adjusting the pan-tilt-zoom position of the camera to a particular position, a controller of the camera automatically moving and setting the current pan-tilt-zoom position of the camera from the particular position to a nearest one of the plurality of preset pan-tilt-zoom positions;
    selecting analytics configuration information associated with the nearest one of the plurality of preset pan-tilt-zoom positions of the camera from the plurality of analytics configuration information; and
    performing surveillance analytics based on the selected analytics configuration information associated with the current pan-tilt-zoom position.

2. The method of claim 1, wherein the step of performing surveillance analytics further includes:
    determining whether to transmit image information based on the selected analytics configuration information associated with the current pan-tilt-zoom position.

3. The method of claim 1, wherein the step of storing a plurality of preset pan-tilt-zoom positions includes:
    storing a plurality of preset pan-tilt-zoom positions in the camera.

4. The method of claim 1, wherein the step of storing a plurality of analytics configuration information includes:
    storing a plurality of analytics configuration information in the camera.

5. The method of claim 1, wherein the step of selecting analytics configuration information associated with the current pan-tilt-zoom position is performed at a remote controller and the remote controller sends the selected analytics configuration information to the camera.

6. The method of claim 1, wherein the camera is enabled to be adjusted to one or more of the plurality of preset pan-tilt-zoom positions.

7. A surveillance system, comprising:
    non-volatile memory operable to store a plurality of preset pan-tilt-zoom positions and a plurality of analytics configuration information, each of the plurality of analytics configuration information associated with a corresponding preset pan-tilt-zoom position in the plurality of preset pan-tilt-zoom positions;
    apparatus that determines a current pan-tilt-zoom position of a camera;
    if a user manually adjusts the pan-tilt-zoom position of the camera to a particular position a controller of the camera automatically adjusts and sets the current pan-tilt-zoom position of the camera from the particular position to a nearest one of the plurality of preset pan-tilt-zoom positions;
    apparatus that selects analytics configuration information associated with the current pan-tilt-zoom position of the camera from the plurality of analytics configuration information; and
    an analytics engine operable to perform surveillance analytics based on the selected analytics configuration information associated with the current pan-tilt-zoom position.

8. The system of claim 7, further including:
    the analytics engine is further operable to determine whether to transmit image information based on the selected analytics configuration information associated with the current pan-tilt-zoom position.

9. The system of claim 7, further including:
    an electromechanical PTZ controller operable to adjust a PTZ position of a camera.

10. The system of claim 7 wherein the means for automatically adjusting and setting the current pan-tilt-zoom position of the camera includes an electromechanical PTZ controller.

11. A program storage device readable by machine, tangibly embodying a program of instructions executable by the machine to perform a method for surveillance system, comprising:
    storing a plurality of preset pan-tilt-zoom positions;
    storing a plurality of analytics configuration information, each of the plurality of analytics configuration information associated with a corresponding preset pan-tilt-zoom position in the plurality of preset pan-tilt-zoom positions;
    determining a current pan-tilt-zoom position of a camera;
    if a user manually adjusts the pan-tilt-zoom position of the camera to a particular position, a controller of the camera automatically moving and setting the current pan-tilt-zoom position of the camera from the particular position to a nearest one of the plurality of preset pan-tilt zoom positions;
    selecting analytics configuration information associated with the current pan-tilt-zoom position of the camera from the plurality of analytics configuration information; and
    performing surveillance analytics based on the selected analytics configuration information associated with the current pan-tilt-zoom position.

12. The program storage device of claim 11, wherein the step of performing surveillance analytics further includes:
    determining whether to transmit image information based on the selected analytics configuration information associated with the current pan-tilt-zoom position.

13. The program storage device of claim 11, wherein the step of storing a plurality of preset pan-tilt-zoom positions includes:

storing a plurality of preset pan-tilt-zoom positions in the camera.

14. The program storage device of claim 11, wherein the step of storing a plurality of analytics configuration information includes:

storing a plurality of analytics configuration information in the camera.

15. The program storage device of claim 11, wherein the step of selecting analytics configuration information associated with the current pan-tilt-zoom position is performed at a remote controller and the remote controller sends the selected analytics configuration information to the camera.

16. The program storage device of claim 11, wherein the camera is enabled to be adjusted to one or more of the plurality of pan-tilt-zoom positions.

* * * * *